(12) United States Patent
Cabot et al.

(10) Patent No.: US 11,066,898 B2
(45) Date of Patent: Jul. 20, 2021

(54) RESIN PLUG FOR WELLBORE ABANDONMENT

(71) Applicant: NAUTONNIER HOLDING CORP., Cochrane (CA)

(72) Inventors: Bernie Cabot, Cochrane (CA); Mark Schumlick, Cochrane (CA)

(73) Assignee: NAUTONNIER HOLDING CORP., Cochrane (CA)

( * ) Notice: Subject to any disclaimer, the term of this patent is extended or adjusted under 35 U.S.C. 154(b) by 66 days.

(21) Appl. No.: 16/365,426

(22) Filed: Mar. 26, 2019

(65) Prior Publication Data

US 2019/0292876 A1   Sep. 26, 2019

Related U.S. Application Data

(60) Provisional application No. 62/648,188, filed on Mar. 26, 2018.

(51) Int. Cl.
*E21B 33/138* (2006.01)
*C09K 8/80* (2006.01)
*C09K 8/516* (2006.01)

(52) U.S. Cl.
CPC ............ *E21B 33/138* (2013.01); *C09K 8/516* (2013.01); *C09K 8/80* (2013.01)

(58) Field of Classification Search
CPC ...... E21B 33/138; E21B 21/003; E21B 33/16; E21B 33/134; E21B 33/14; E21B 33/1208; E21B 33/12; E21B 33/1293; C09K 8/44; C09K 8/5086; C09K 8/512; C09K 8/426
See application file for complete search history.

(56) References Cited

U.S. PATENT DOCUMENTS

| | | | | |
|---|---|---|---|---|
| 3,696,867 | A | * | 10/1972 | Waid ....................... E21B 43/04 166/276 |
| 4,651,875 | A | * | 3/1987 | Lang ..................... E21D 20/026 206/219 |
| 5,178,218 | A | * | 1/1993 | Dees ....................... C09K 8/565 166/281 |
| 5,332,037 | A | * | 7/1994 | Schmidt .................. C04B 28/02 166/276 |
| 8,132,623 | B2 | * | 3/2012 | Allin .................... C09K 8/5083 166/300 |

\* cited by examiner

*Primary Examiner* — Zakiya W Bates
(74) *Attorney, Agent, or Firm* — Bennett Jones LLP

(57) ABSTRACT

A resin plug for wellbore abandonment includes: an amount of a heavier resin and an amount of a light weight resin, the heavier resin configured to have a faster setting rate than the light weight resin. The resin plug creates a seal for wellbore abandonment by the heavier resin setting first followed by setting of the light weight resin thereafter. Any void formed during setting of the heavier resin is filled by the light weight resin before the light weight resin sets.

6 Claims, 2 Drawing Sheets

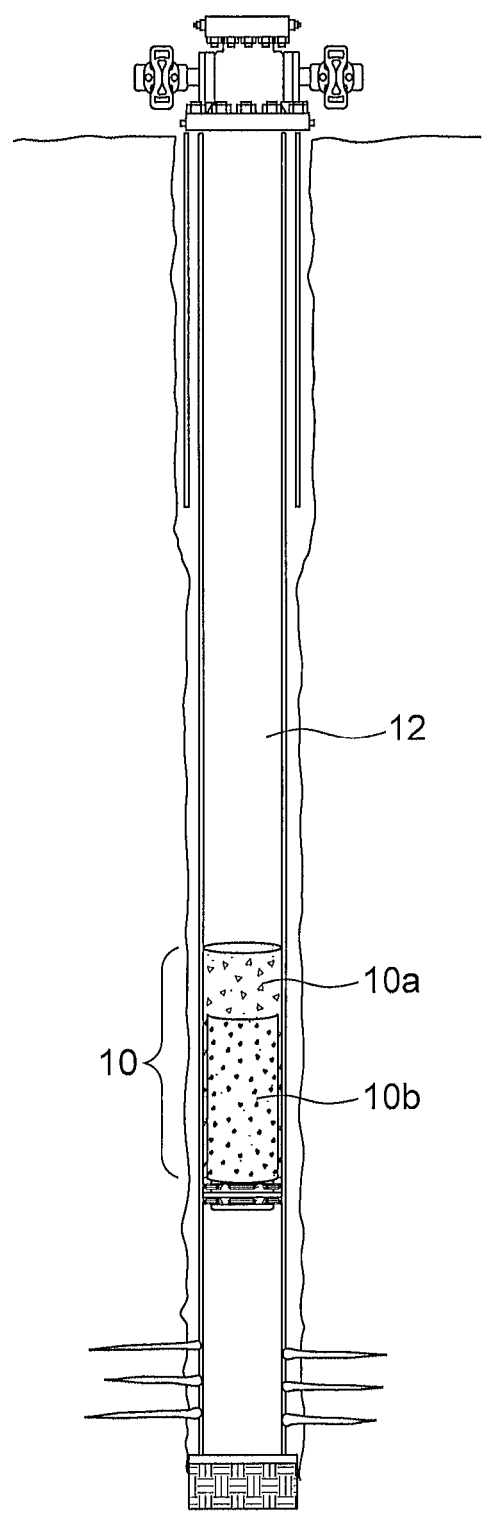
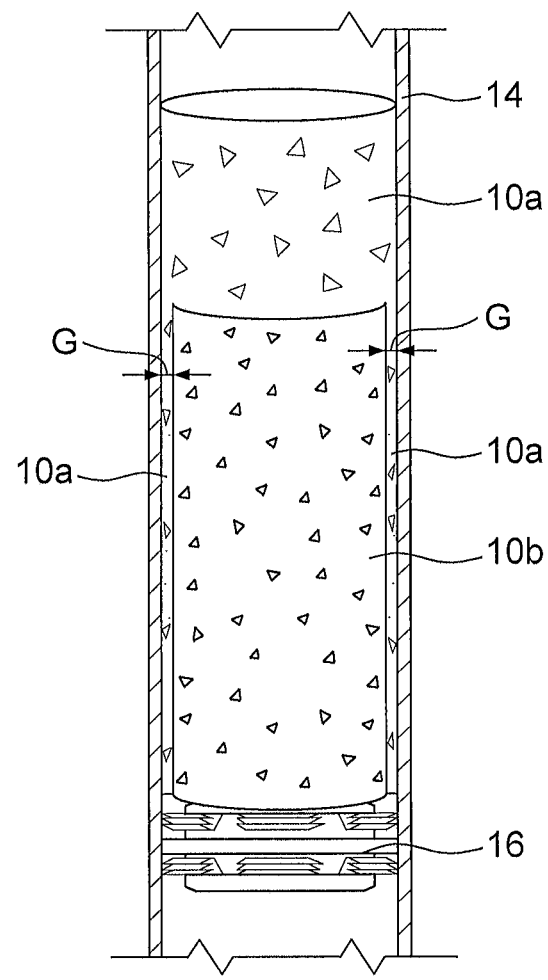

RESIN PLUG FOR WELLBORE ABANDONMENT

FIELD

The present invention relates to a resin plug for wellbore abandonment and method for placement.

BACKGROUND

Resin plugs are employed to seal off an abandoned well. The plug is introduced as a liquid resin and is held in place in the well. The plug creates a seal after the resin sets. Historically as a resin plug hardens, minor shrinkage of the plug may occur. As a resin plug shrinks, it may pull away from the wellbore wall and creates a small gap between the wellbore wall and the set resin. This shrinkage, and in particular the resulting gap, effectively minimizes the resin plug's usefulness as a permanent barrier within a wellbore.

SUMMARY

In accordance with a broad aspect of the present invention, there is provided a resin plug for wellbore abandonment comprising: an amount of a heavier resin and an amount of a light weight resin, the heavier resin configured to have a faster setting rate than the light weight resin.

In accordance with another broad aspect of the present invention, there is provided a method for placing a seal in a wellbore, the method comprising: placing a liquid resin in the wellbore, the liquid resin including an amount of a heavier resin and an amount of a light weight resin, the heavier resin configured to have a faster setting rate than the light weight resin, the heavier resin residing in the wellbore below the light weight resin; and the seal being formed by the heavier resin setting first followed by setting of the light weight resin thereafter, wherein a void formed during setting of the heavier resin is filled by the light weight resin before the light weight resin sets.

It is to be understood that other aspects of the present invention will become readily apparent to those skilled in the art from the following detailed description, wherein various embodiments of the invention are shown and described by way of illustration. As will be realized, the invention is capable of other and different embodiments and its several details are capable of modification in various other respects, all within the present invention. Accordingly the drawings and detailed description are to be regarded as illustrative in nature and not as restrictive.

BRIEF DESCRIPTION OF THE DRAWINGS

Referring to the drawings, several aspects of the present invention are illustrated by way of example, and not by way of limitation, in detail in the figures, wherein:

FIGS. 1 and 2 are schematic views through a wellbore, according to one aspect of the present invention, showing the plug at various stages, where FIG. 2 is later in time than FIG. 1.

FIG. 3 is an enlarged view of the final set plug of FIG. 2.

DESCRIPTION OF VARIOUS EMBODIMENTS

Figure 1:
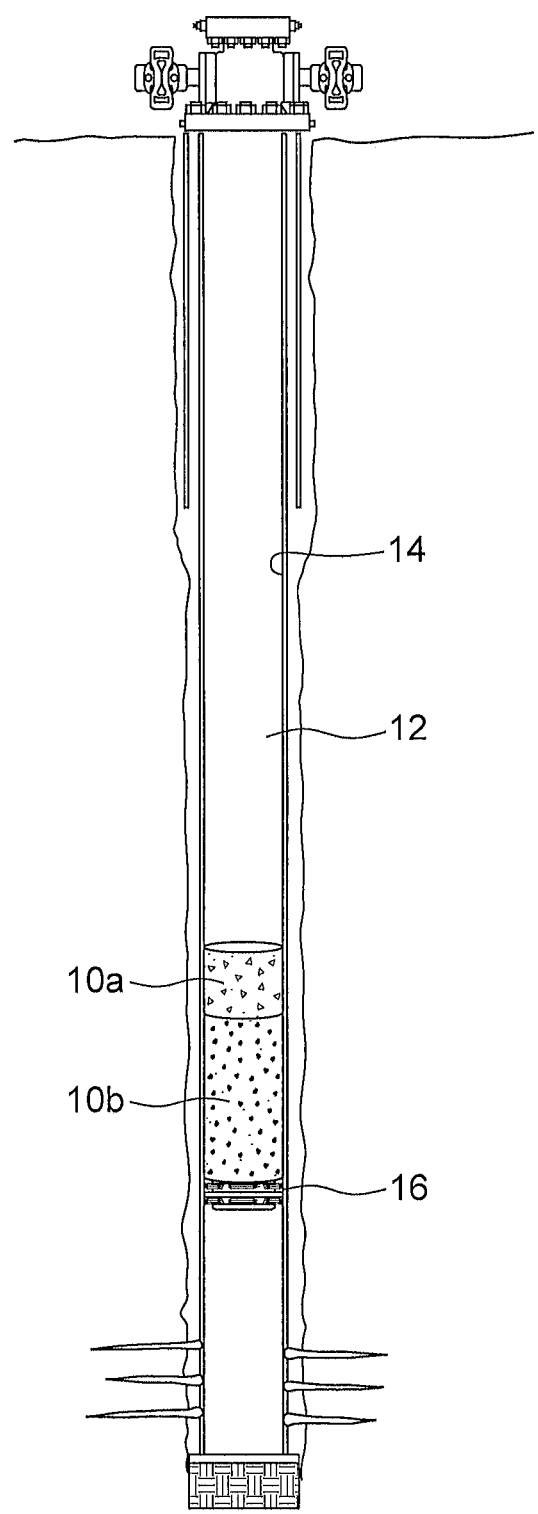

The detailed description set forth below in connection with the appended drawings is intended as a description of various embodiments of the present invention and is not intended to represent the only embodiments contemplated by the inventor. The detailed description includes specific details for the purpose of providing a comprehensive understanding of the present invention. However, it will be apparent to those skilled in the art that the present invention may be practiced without these specific details.

A resin plug for wellbore abandonment and a method of placement have been invented.

A resin plug can be placed and allowed to set in a wellbore. When introduced to the well, a resin plug includes resin in a liquid state. After placement in the well, the liquid resin sets up, which is the resin's hardening phase, to a solid resin, such that the final resin plug is a solid in the well. With reference to the Figures, a resin plug 10 according to one aspect of the present invention is shown in place in a well 12. FIG. 1 shows resin plug 10 at a time when the resin plug has recently been placed in a well 12 and the resin is still in the liquid state, prior to setting up. FIGS. 2 and 3 show the resin plug 10 of FIG. 1 after it has set up to a solid.

The present resin plug 10 includes two resins 10a, 10b, including: (i) a first amount of resin, called herein a light weight resin 10a and a second amount of resin, called herein a heavier resin 10b, has (i) a weight greater and (ii) a setting rate faster than the light weight resin. The resin amounts are configured for placement in the wellbore in a liquid state and for set up in the well. The resin amounts are configured such that, when in a liquid state and placed in the wellbore, the heavier resin 10b resides below (according to gravity) the lighter resin 10a. Also, the heavier resin sets up more quickly than the light weight resin such that while heavier resin 10b sets up and becomes a solid, lighter resin 10b above the heavier resin remains in a liquid state for an amount of time after the heavier resin has set up. The light weight resin 10a also eventually sets up to a solid state to form the final resin plug. The present resin plug has therefore been termed herein as a 2-stage, weighted resin plug. The term 2-stage is used herein to mean that the plug includes the two amounts of resin: the heavier resin and the lighter resin.

The resin plug is useful in various kinds of wells but it may be particularly useful in a cased wellbore where well is lined with a liner 14 such as casing.

The plug is held in place in the well until at least the heavier resin sets. As such, the plug may be placed on a platform such as a bridge plug 16, packer, cement plug, or other structure within the well. The platform need not have significant pressure holding capabilities, but instead simply is configured to hold the resin in place until it sets.

As noted above, prior resin plugs suffer from issues relating to resin shrinkage. The general function and purpose of a 2-stage weighted resin plug addresses the issue of resin shrinkage during its setup. In particular, since the heavier resin sets first, any gap G that develops due to resin shrinkage can be filled by light weight resin 10a flowing into and substantially filling the gap before it also sets. The void, gap G, created by shrinkage of the heavier resin is generally between the outer side surfaces of the hardened heavier resin plug and the constraining walls of the wellbore, which in a cased well is the inner facing wall of liner 14. The light weight resin, then, flows into this semi- or fully annular space and thereafter hardens as a thin, semi- or fully annular filler, surrounding the hardened heavier resin plug.

The light weight resin 10a and the heavier resin 10b are any of the many resins suitable for wellbore sealing. Both resins, have a specific gravity that prevents them from floating and are durable in wellbore conditions. Both resins may have a viscosity that allows them to flow when in the liquid state, such as a viscosity similar to that of water.

A liquid resin can be configured for use as the heavier amount or the light weight amount, respectively, by selection or modification of each resin amount to create a weight and set-up rate differential between the two amounts. This may include selection of two different base resins or modification of a single resin composition with respect to weighting agents and hardening chemicals to achieve the differential weight and setup rate between light weight resin $10a$ and heavier resin $10b$. The two resins $10a$, $10b$ may also have different viscosities or other phase differentiators.

In embodiments, the light weight resin may have a density of about 900 to 1300 kg/m$^3$ or 1050 to 1300 kg/m$^3$ (specific gravity greater than water and up to about 1.5) and the heavier resin has a density greater than that. Alternately or in addition, the light weight resin may have a setting time 10-20 times longer than the heavier resin. In one embodiment for example, the heavier resin $10b$ has a setting time of 2-10, such as 4-8 hours, and the lighter resin has much longer time required for setting such as more than 40 hours or possibly even 60 hours or more. The difference in setting time may be achieved in various ways, as will be appreciated. For example, in one embodiment, the heavier resin is configured to set faster than the light weight one by minor adjustments to the heavier resin recipe relative to the lighter resin recipe. For example, by adding a hardening agent to the heavier resin that is not present, or present in lower concentration, in the lighter resin.

In one embodiment, the two resins $10a$, $10b$ are based on the same resin: a vinyl ester resin, which include esters derived from vinyl alcohol for example vinyl acetate, vinyl propionate and vinyl laureate. The heavier resin and the lighter resin are obtained by (i) adjusting their relative specific gravity by adding concentrations of a weighting agent such as barite and (ii) adjusting their relative hardening rates by addition of a hardening agent (also sometimes called an initiator or an activator) such as, for example, one or more of a N-dimethyl-p-toluide or a dibenzoyl peroxide. In one embodiment, the heavier resin contains higher concentrations of both the weighting agent and the hardening agent than the lighter resin. The concentrations provide the heavier vinyl ester resin with a specific gravity of 1.3-1.9, or possibly 1.5-1.7 specific gravity, and a hardening time of 4-8 hours.

A method is based on delivering the 2-stage liquid resin to a point within the wellbore to be abandoned and allowing the resin to setup to form the final plug and, thereby, to create a seal in the wellbore to prevent fluid communication from an accessed formation to surface.

The method includes: placing a liquid resin in the wellbore, the liquid resin including an amount of a heavier resin and an amount of a light weight resin, the heavier resin configured to have a faster setting rate than the light weight resin, the heavier resin residing in the wellbore below the light weight resin. The seal is formed by setting of the heavier resin first followed thereafter by setting of the light weight resin. In the method, any external void, such as a semi- or fully annular gap G between the heavier resin and the well's restraining wall such as liner 14, formed during setting of the heavier resin is substantially filled by the light weight resin before setting thereof. The lighter resin substantially fills the gap and may also have at least a portion thereof spanning the well inner diameter above the heavier resin.

In one embodiment of a method, the resins for a 2-stage resin plug are placed in the well by employing a payload container. Both resins can be placed in the well at the same time in one trip, if desired. For example, the two amounts of resin (the heavier resin and the lighter resin) are introduced to the payload container. The two resins are added to the payload container with the heavier weighted resin placed within the payload container and the second light weight resin on top of the heavier resin. The heavier resin can be added to the container first followed by the second, lighter one. The payload container is configured for running into the well to be abandoned.

The payload container is run in to a predefined depth within a wellbore, such as a steel cased 14 wellbore, and the 2 stage liquid resin is placed into the wellbore. The resins flow out of the payload container and fill a section of the well above a platform 16 on which they are placed. The difference in weight between the two resins causes them to become positioned in two layers in the well with the lighter resin residing on top of the heavier resin (FIG. 1). The resin amounts are configured for placement in the wellbore in a liquid state and will set up in the well. The resin amounts are configured such that, when placed in the wellbore, the heavier resin remains below the lighter resin.

The empty payload container is then recovered to surface. The payload container in one embodiment returns to surface by buoyancy through a water column in the well.

The lower stage heavy weighted resin $10b$ has a quicker setup time than the upper stage lightweight resin $10a$. When the heavier weighted resin hardens, it has a slight shrinkage factor and thus a void, gap G, will be created between the casing and the resulting hardened resin plug of the heavier resin.

The lighter resin, which is on top of the heavier resin, has a much slower setup time and remains liquid after the heavier resin has hardened. Thus, once the bottom stage resin plug is set/hardens, the void is filled by a downward flow of upper stage, light weight resin liquid (FIG. 2). In particular, the lighter resin which remains liquid until after the heavier resin has set, can flow down to fill any void created by shrinkage of the heavier resin. As the light weight upper stage resin sets up it adheres to the steel casing because the thickness of the light weight resin in the void is so small that the effect of shrinkage is practically eliminated. Together, the 2-stage resin, when both amounts of resin set, creates an impermeable plug that can withstand high hydrostatic pressures.

Tests have been conducted on vinyl ester-based plugs where barite and hardening agents were used to select the weight and hardening rate of the heavier amount over the lighter amount. Such plugs were successfully pressure tested to 21 MPa.

The previous description of the disclosed embodiments is provided to enable any person skilled in the art to make or use the present invention. Various modifications to those embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the full scope consistent with the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the elements of the claims. Moreover, nothing disclosed herein is intended to be dedicated to the public regardless of whether such disclosure is explicitly recited in the claims. No claim element is to be construed under the provisions of 35 USC 112, sixth paragraph, unless the element is expressly recited using the phrase "means for" or "step for".

We claim:

1. A method for placing a seal in a wellbore, the method comprising: placing a liquid resin in the wellbore, the liquid resin including an amount of a heavier liquid resin and an amount of a light weight liquid resin, the heavier liquid resin configured to have a faster setting rate than the light weight liquid resin and after placing, the heavier liquid resin residing in the wellbore below the light weight liquid resin; and the seal being formed by the heavier liquid resin setting first followed by setting of the light weight liquid resin thereafter, wherein a void formed during setting of the heavier liquid resin from a liquid to a solid is filled by a portion of the light weight liquid resin flowing to fill the void before the light weight liquid resin sets.

2. The method of claim 1 wherein the light weight liquid resin has a setting rate 10 to 20 times longer than the heavier liquid resin.

3. The method of claim 1 wherein during placing the amount of the heavier liquid resin and the amount of the light weight liquid resin are placed in the well at the same time.

4. The method of claim 1 wherein placing releases the liquid resin on a platform in the wellbore.

5. The method of claim 1 wherein the void is between a wall of the wellbore and an outer side surface of the amount of the heavier liquid resin after the heavier liquid resin sets to a solid.

6. The method of claim 1 further comprising selecting the heavier liquid resin to have a specific gravity of 1.3-1.9.

* * * * *